United States Patent [19]

Corbett et al.

[11] 4,244,783
[45] Jan. 13, 1981

[54] MONITORING OF TRITIUM

[75] Inventors: James A. Corbett, Turtle Creek; Sterling A. Meacham, Greensburg, both of Pa.

[73] Assignee: The United States of America as represented by the United States Department of Energy, Washington, D.C.

[21] Appl. No.: 544,594

[22] Filed: Jan. 27, 1975

Related U.S. Application Data

[63] Continuation of Ser. No. 322,332, Jan. 10, 1973, abandoned.

[51] Int. Cl.² ............................................. G21C 17/00
[52] U.S. Cl. ................................ 176/19 R; 310/301; 313/54; 324/459; 176/37
[58] Field of Search ................ 176/19 R, 19 LD, 37; 310/3 R, 3 D; 324/33; 73/19; 313/54

[56] References Cited

U.S. PATENT DOCUMENTS

| 2,817,776 | 12/1957 | Cohen | 310/3 D |
| 2,884,538 | 4/1959 | Swift | 310/3 R |
| 3,683,272 | 8/1972 | Vissers et al. | 176/19 R |
| 3,712,850 | 1/1973 | Campbell et al. | 176/19 R |

FOREIGN PATENT DOCUMENTS 1317162  12/1962  France ............................... 176/19 LD Primary Examiner—Harvey E. Behrend
Attorney, Agent, or Firm—James E. Denny; R. V. Lupo; Z. L. Dermer

[57] ABSTRACT

The fluid from a breeder nuclear reactor, which may be the sodium cooling fluid or the helium reactor-cover-gas, or the helium coolant of a gas-cooled reactor passes over the portion of the enclosure of a gaseous discharge device which is permeable to hydrogen and its isotopes. The tritium diffused into the discharge device is radioactive producing beta rays which ionize the gas (argon) in the discharge device. The tritium is monitored by measuring the ionization current produced when the sodium phase and the gas phase of the hydrogen isotopes within the enclosure are in equilibrium.

7 Claims, 4 Drawing Figures

MONITORING OF TRITIUM

The U.S. Government has rights in this invention pursuant to Contract No. AT(30-1)-4210 [AT(11-1)-3045] between the U.S. Atomic Energy Commission, now the Department of Energy, and Westinghouse Electric Corporation.

This is a continuation of application Ser. No. 322,332 filed Jan. 10, 1973, now abandoned.

BACKGROUND OF THE INVENTION

This invention relates to the nuclear-reactor art and has particular relationship to reactors, typically breeder nuclear reactors in which tritium is produced. As is well known in the art, a breeder nuclear reactor produces more fuel than it consumes during the generation of useful energy. The consumable fuel contains fissile materials which undergo fission and produce heat. The heat is transferred to a reactor coolant which flows through a reactor vessel wherein the fissile fuel is contained. The heat thus acquired by the reactor coolant is used to generate steam which is then used to produce electricity. Typically in this type of reactor a void exists above the level of reactor coolant within the reactor vessel. The void is generally filled with an inert gas so as to not adversely effect the reactor coolant. This gas is commonly referred to, in the nuclear art, as the reactor cover gas (see Reactor Handbook, Volume IV, Second Edition (1964) published by Interscience Publishers, p.p. 327 and 790).

In this type of nuclear reactor, tritium results typically from reactions of neutrons and alpha particles; that is, helium nuclei, in the boron 10 of the control rods and in the lithium 6 impurities in the fuel and by ternary fission. The collision of a neutron with an alpha particle results in the ejection of a proton from the alpha particle producing tritium nucleus which is converted into tritium by absorption of an electron. Tritium is radioactive emitting beta particles and becoming converted into Helium 3.

Tritium is produced both in the coolant fluid, typically sodium, and in the reactor-cover-gas, typically helium. In either case the tritium contaminates the coolant fluid in the primary loop and, because it diffuses through metals it may contaminate the secondary fluid and structures in the vicinity of the nuclear reactor. It is then desirable in the interest of health and safety to minimize the concentration of tritium in the coolant fluid and reactor-cover-gas; indeed, it is desirable to reduce the concentration of tritium to zero.

In accordance with the teachings of the prior art, the tritium is reduced by operating continuously cold traps in the reactor fluid channels which crystallize out hydrogen and its isotopes. Another tritium suppression process is disclosed in application Ser. No. 261,476 filed June 6, 1972 to Richard Paul Colburn, entitled Method For Removing Fission Products From a Nuclear Reactor Coolant, and assigned to Westinghouse Electric Corporation. In accordance with Colburns's teachings, the coolant fluid is continuously cycled through a bypass where hydrogen is added to it and the hydrogen, deuterium, and tritium are precipitated as sodium hydrides. This process is referred to as cold slagging.

Continuous cold trapping or cold slagging which the above-described prior art processes require presents serious difficulties. The cold trap, while in operation, traps out, not only the hydrogen isotopes, and oxygen, but also other radioactive elements which otherwise may readily remain in the fluid without hazard. The cold trap as a result of the continuous cold trapping, then soon becomes radioactively hot so that it cannot be conveniently handled. Like reasoning is applicable to cold slagging which operates at a substantially higher rate than cold trapping.

To avoid continuous trapping, it is desirable to monitor the tritium in the fluid and when the tritium reaches a preset threshold to remove it by effective cold trapping or slagging for a relatively short time interval. Such a preferred procedure demands proper and reliable monitoring of the fluids.

In accordance with the teachings of the prior art, attempts have been made to carry out the monitoring by analysis of coolant samples. Typically, samples of sodium are removed from the test-loop system or the reactor vessel, the hydrogen and its isotopes separated out and the quantity of tritium determined by radiometric measurement. This process is tedious and time consuming; there may be excessive build up of tritium during the time which elapses between successive analyses. In addition, this process is unreliable because segregation occurs during the bypass sampling. Also, this monitoring process is not continuous. Sudden large changes in the tritium concentration, which reveals a defect in the operation of the reactor, are not quickly detectable.

It is an object of this invention to overcome the above desired disadvantages and deficiencies of the prior art and to provide for the prompt, effective and reliably continuous monitoring of the tritium content or concentration of reactor fluid, without necessitating removal and analysis of fluid samples and in such manner that the content or concentration at any time shall be determinable in a short time interval.

SUMMARY OF THE INVENTION

This invention arises from the realization that the radioactive emission from tritium in the quantities in which it is present in the reactor fluid is capable of producing readily measurable electrical current in an ionizable medium. In accordance with this invention, the reactor fluid is passed over a wall, permeable to hydrogen and its isotopes including tritium, of a discharge device. This device contains a gas which is ionizable by the emission from the tritium. The beta rays emitted by the tritium have a maximum energy 18.6 thousand electrons volts (KeV) and predominantly an average energy at about 6 KeV. This energy exceeds the ionization energy of argon and argon is the preferred ionizable gas in the discharge device although other gases, both inert and reactive may be used. It has been discovered, and can be shown, that the discharge current produced by the emissions from the tritium derived from a typical breeder reactor can be readily measured.

Tritium in a breeder reactor is produced by $(n,\alpha T)$ reactions in the $^{10}B$ of the control rods and in the $^{6}Li$ impurities in the fuel, and by ternary fission. The total tritium production is approximately 40 Ci per full power-day, the control rod source being 83.5% of the total. The equilibrium tritium concentration in the liquid sodium coolant of the reactor is some factor of the number of full power-days that the reactor is in use. At equilibrium, the tritium being produced equals the tritium loss to the secondary liquid sodium system of the reactor and to other areas such as heat exchangers. The final concentration produced can be represented by 40 Ci.

For the following calculations, 1 full power-day production is assumed to be the equilibrium concentration. This amount is considered conservative by a factor of 5 to 10.

Converting Curies to Atoms at Equilibrium, 40 Ci:

$$\chi A = \lambda N$$

where
 $A$ = activity in atoms sec$^{-1}$
 $\lambda$ = decay constant in sec$^{-1}$
 $N$ = number of atoms
 $\chi$ = 1 full power-day
for tritium, $$\lambda = \frac{\ln 2}{t_{\frac{1}{2}}} \text{ where } t_{\frac{1}{2}} = 12.33 \text{ years}$$

$$\lambda = \frac{0.693}{12.33 \text{ years} \times 3.16 \times 10^7 \text{ sec yr}^{-1}}$$

$$\lambda = 1.78 \times 10^{-9} \text{ sec}^{-1}$$

therefore $$N = \frac{A}{\lambda} = \frac{(40)(3.7 \times 10^{10} \text{ atoms sec}^{-1})}{1.78 \times 10^{-9} \text{ sec}^{-1}}$$

$$N = 8.35 \times 10^{20} \text{ atoms of tritium produced}$$

Number of gram atoms are $$\frac{8.35 \times 10^{20} \text{ atoms}}{6.02 \times 10^{23} \text{ atoms}} \text{ (g atom)}^{-1} = 1.38 \times 10^{-3} \text{ g atoms}$$

Mass of tritium is $1.38 \times 10^{-3}$ g atoms $\times 3$ gms(g atom)$^{-1} = 4.14 \times 10^{-3}$ gms Concentration of tritium in sodium is, assuming a system containing $2 \times 10^{-8}$ gms of sodium which is typical.

$$\frac{4.14 \times 10^{-3} \text{ gms}}{2 \times 10^8 \text{ gm Na}} = 2.07 \times 10^{-11} \text{ gms } T_2/\text{gm Na} \quad \text{(grams of tritium per gram of sodium)}$$

or $2.07 \times 10^{-5}$ ppm $T_2$ $T_2$ is a molecule of tritium assuming no hydrogen ($H_2$) present. The equilibrium tritium pressure associated with the concentration of $2.07 \times 10^{-5}$ ppm can be calculated from the Sieverts' coefficient if the assumption that the solubilities of hydrogen and tritium are the same. From Meachams' et al., solubility data $$\log P_{H_2} \text{ (cm)} = 10.82 - \frac{6400}{\tau} \text{ where } \tau = \text{Kelvin}$$

and $$\log \text{ ppm } H_2 = 6.52 - \frac{3180}{\tau}$$

then at 750° C.

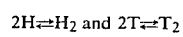

$P_{H_2} = 3.72 \times 10^4$ cm ppm $H_2 = 2.57 \times 10^3$ ppm

The Sievert's coefficient is:

$$S = \frac{\text{ppm } H_2}{\sqrt{P_{H_2}, \text{ cm}}} = \frac{2.57 \times 10^3 \text{ ppm}}{\sqrt{3.72 \times 10^4 \text{ cm}}}$$

$$S = 13.4 \text{ ppm (P,cm)}^{-\frac{1}{2}}$$

for tritium, $S = 40.2$ ppm (P,cm)$^{-\frac{1}{2}}$

The corresponding equilibrium tritium pressure would be $$\frac{(\sqrt{1 \text{ cm}})(2.07 \times 10^{-5} \text{ ppm})}{40.2 \text{ ppm}} = \sqrt{X \text{ cm}}$$

squaring both sides $$\frac{1 \text{ cm } (2.07)^2 \times 10^{-10} \text{ ppm}^2}{(40.2)^2 \text{ ppm}^2} = X \text{ cm}$$

equilibrium pressure $= 2.65 \times 10^{-13}$ cm or $\frac{2.65 \times 10^{-13} \text{ cm}}{76 \text{ cm atm}^{-1}} = 3.5 \times 10^{-15}$ atm of tritium The corresponding equilibrium hydrogen pressure, assuming a prototypic condition of 1 ppm, would be $$\frac{(\sqrt{1 \text{ cm}})(1 \text{ ppm})}{13.4 \text{ ppm}} = \sqrt{X \text{ cm}}$$

$$\frac{(1 \text{ cm})(1 \text{ ppm}^2)}{(13.4)^2 \text{ ppm}^2} = \sqrt{X \text{ cm}}$$

equilibrium pressure $= 5.56 \times 10^{-3}$ cm $$\frac{5.56 \times 10^{-3} \text{ cm}}{76 \text{ cm atm}^{-1}} = 7.32 \times 10^{-5} \text{ atm of hydrogen}$$

If the hydrogen and tritium in the sodium are allowed to equilibrate with a known volume, via a permeable nickel membrane, the partial pressure of each of its corresponding equilibrium pressure, P, for a given concentration.

$2H \rightleftharpoons H_2$ and $2T \rightleftharpoons T_2$

In this case
 for 2H@1 ppm, P is $7.32 \times 10^{-5}$ atm
 for 2T@$2.07 \times 10^{-5}$ ppm, P is $3.50 \times 10^{-15}$ atm
However, isotopic exchange is also taking place $$H_2 + T_2 \rightleftharpoons 2HT$$

and the equilibrium pressure of HT is the ratio of the concentrations of $H_2$ and $T_2$ in the sodium or $4.84 \times 10^4 : 1$ thus

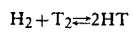

$P_{68}$ for HT is $1.52 \times 10^{-9}$ atm

This equilibrium pressure in a detector having a volume of 100 cubic centimeters at STP would correspond to a specific number of tritium atoms given by $$PV/R\tau = n$$

where $P = P_t$, $1.52 \times 10^{-9}$ atm
$V = 100$ cm$^3$
$\tau = 298°$ K.
$R = 82.057$ atm cm$^3$ °K$^{-1}$ mole$^{-1}$
$n = $ moles of HT $$\frac{(1.52 \times 10^{-9})(10^2)}{(82.057)(298)} = 6.2 \times 10^{-12} \text{ moles}$$

and $6.2 \times 10^{-12}$ moles $\times 6.02 \times 10^{23}$ molecules mole$^{-1}$ = $3.73 \times 10^{12}$ molecules of HT
The number of tritium atoms in these molecules of HT are $3.73 \times 10^{12}$ atoms Thus, at equilibrium, the activity present in the detector is $$A = \lambda N = 1.78 \times 10^{-9} \text{ sec}^{-1} \times 3.73 \times 10^{12} \text{ atoms}$$

$$A = 6.65 \times 10^3 \text{ atoms sec}^{-1}$$

The amount of ion pairs formed in the 100 cm$^3$ detector are, assuming that the geometry is such that 50% of the $\beta$ particles enter and spend an average 2 cm path length in the effective volume;

$$(6.65 \times 10^3 \text{ atom sec}^{-})(0.5)(20 \text{ mm})(10 \text{ ion prs mm}^{-1}) = 6.65 \times 10^5 \text{ ion prs sec}^{-1}$$

The current, I, will be the corresponding charge per second $$I = 6.65 \times 10^5 \times 1.6 \times 10^{-19} = 1.06 \times 10^{-13} \text{ amps}$$

with a resistance, R, of $10^{11} \Omega$, the voltage, V, would be $$1.06 \times 10^{-13} \text{ A} \times 10^{11} \Omega = 1.06 \times 10^{-2} \text{ V}$$

Dynamic equilibrium is reached due to the flowing sodium passing the nickel membrane at velocities of 65 cm$^3$ sec$^{-1}$ with a detector volume of 100 cm$^3$. Since the volume of the total sodium system is massive compared to the diffusion area, the membrane will view the tritium as a constant source and the diffusion rate of H$_2$, T$_2$, and HT are governed by $$\phi = \frac{K}{X} a (P_1^{\frac{1}{2}} - P_2^{\frac{1}{2}}) e^{-Q/RT}$$

where:
$\phi = $ flux (diffusion)
K = hydrogen penetration constant for the membrane
X = membrane thickness a = area of membrane exposed to sodium
P$_1$ = pressure on the membrane of hydrogen in sodium phase
P$_2$ = counter pressure in the membrane of hydrogen in gas phase in discharge device
Q = activation energy of hydrogen
R = Rydberg's constant
$\tau$ = absolute temperature of sodium and diffused gas
e = exponential For a system such as just described, calibration against known H$_2$:T$_2$ ratios yields a current relationship to tritium concentration in sodium at given temperature $\tau$ and volume V.

It can be shown by calculations that if only tritium were present, the equilibrium pressure of $10^{-15}$ atmospheres would yield $4.6 \times 10^{-2}$ atoms sec$^{-}$ or 1 disintegration every 21 seconds which would render the detector insensitive. However, under the most conservative reactor conditions, the hydrogen level could be reduced to 0.1 ppm with continuous cold trapping. Sufficient hydrogen would still be present for favorable isotopic exchange, H$_2$+T$_2$⇌2HT yielding a sufficient equilibrium pressure of HT. The hydrogen equilibrium pressure must be known to convert the produced current to tritium concentration. This pressure can be determined from a hydrogen meter with which the reactor is provided.

The above discussion covers the reactor coolant fluid but like reasoning is applicable to the cover-gas.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, wherein.

Figures 3, 4:
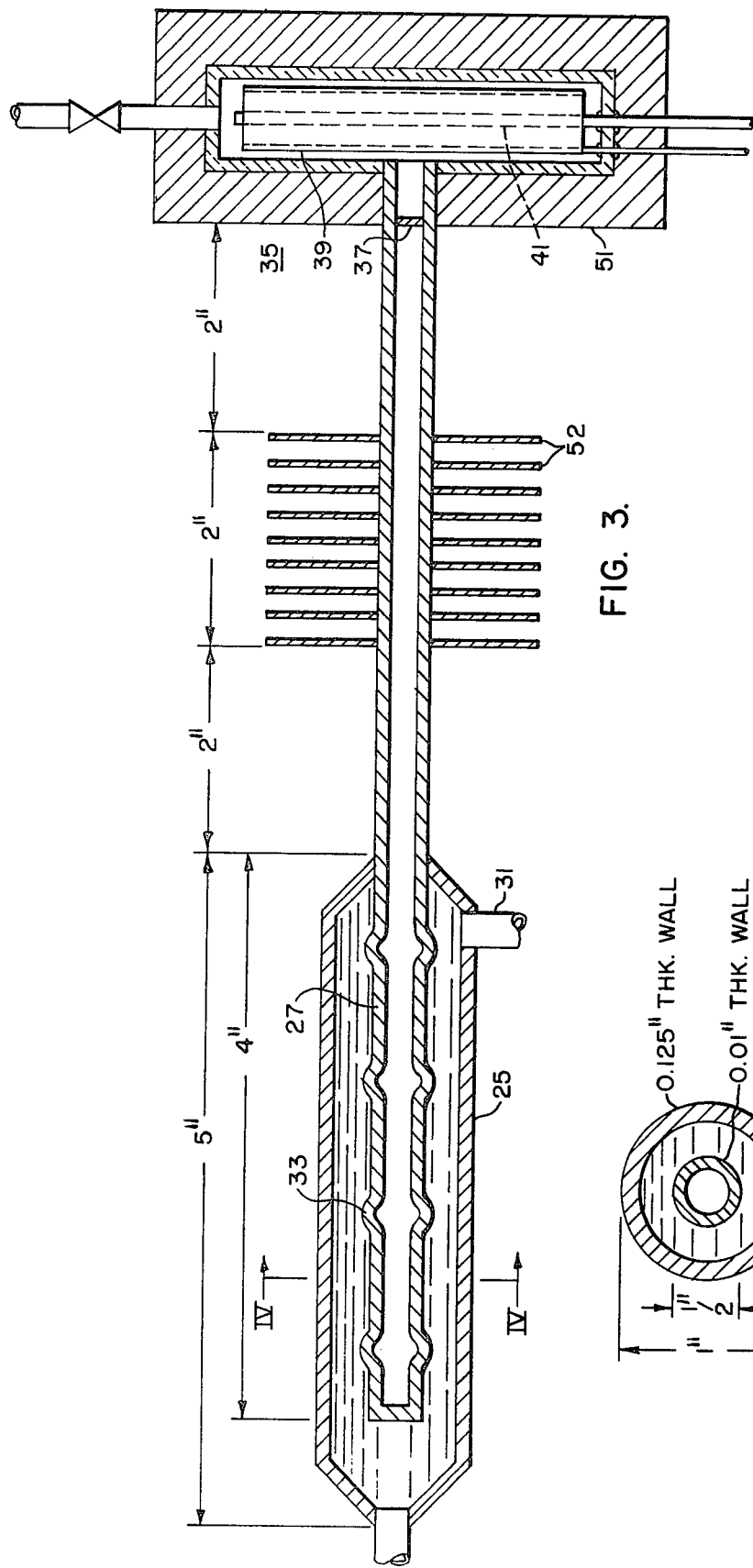
FIG. 3 is a fragmental view on longitudinal section showing discharge apparatus in accordance with this invention as it is used in the apparatus shown in FIG. 1.
FIG. 4 is a view in section taken along line IV-IV of FIG. 3.

The dimension shown in FIGS. 3 and 4 are presented for the purpose of aiding those skilled in the art to practice this invention and not with any intention of in any way limiting this invention.

DETAIL DESCRIPTION OF INVENTION

Figure 1:
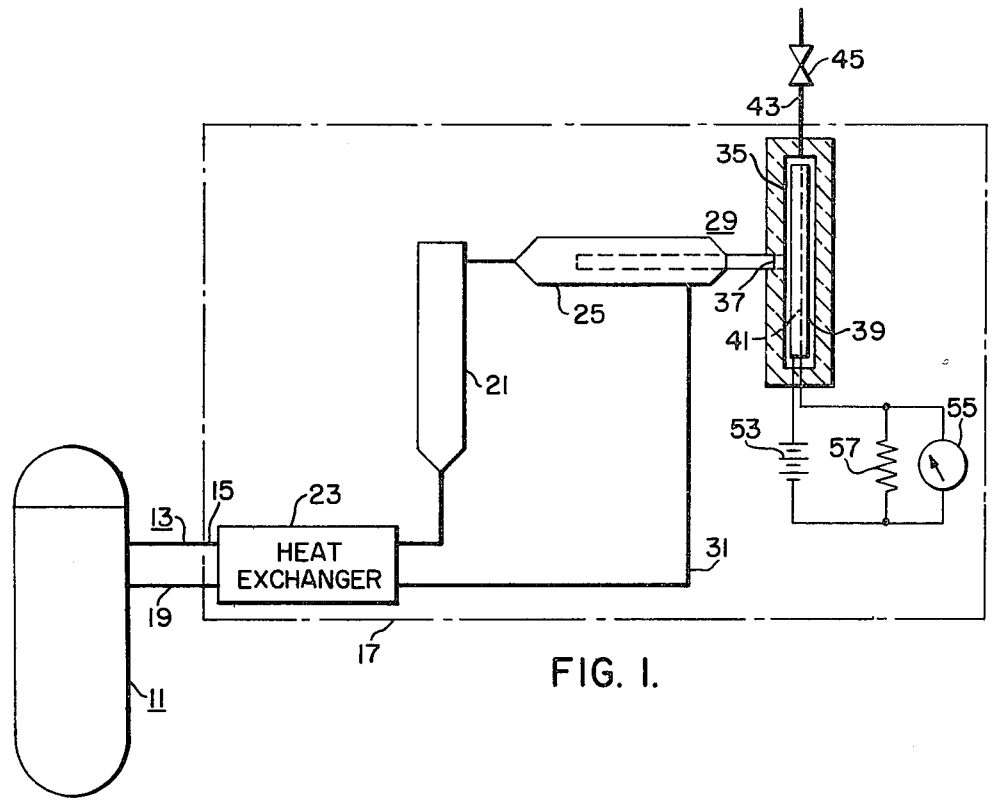
FIG. 1 is a diagrammatic view showing apparatus for monitoring the coolant fluid of a breeder reactor for tritium.

The apparatus shown in FIGS. 1 and 3 includes a reactor vessel 11, typically of the breeder type whose primary coolant is liquid sodium. This apparatus also includes a sampling reactor coolant flow line 13. The liquid sodium flow from the vessel 11 through a branch 15 of the line to the sodium sampling system 17 of a hot cell and returns to the reactor vessel 11 through a branch 19 of the line 13. The system 17 includes a vanadium wire module 21.

The vanadium wire module 21 is known in the art and does not form a part of this invention nor does it function as part of this invention. As shown in FIG. 1, the downstream side of the module 21 comprises a convenient place to locate the jacket 25. The purpose, construction and function of a vanadium wire module may be determined from a review of an article by D. L. Smith in the May, 1971 issue of Nuclear Technology, Pages 115-119, entitled "An Equilibrium Method for Measuring Low-Oxygen Activities in Liquid Sodium". Reference may also be had to report ANL/ST-6 dated Jan. 1971, Pages 35-38, the report being available through the National Technical Information Service, Springfield, Va. The sodium as it leaves the vessel 11 is at about 500° C. The sytem 17 includes a heat exchanger 23 in which the sodium is heated to 750° C.

The sodium which flows out of the module 21 is at about 750° C. and is uniquely suited for deriving hydrogen and its isotopes by diffusion. The sodium flows from the module 21 through a jacket 25 which is sealed to a tube 27 (FIG. 3) forming part of discharge device 29; the tube 27 is permeable to hydrogen and its isotopes. The sodium returns through branch 31 of the flow line 13, heat exchanger 23 and branch 19. A cold trap (not shown) may be included in line 13 which may be enabled as indicated by the monitor to remove tritium from the vessel 11. The flow line 13 and the jacket 25 are composed corrosion-resistant material, typically 316 stainless steel. The jacket 25 has a thickness sufficient to minimize any loss of hydrogen by diffusion through the jacket. The tube 27 is composed of nickel which has a substantially higher permeability to hydrogen and its isotopes than stainless steel. As shown in FIG. 3 the tube 27 has a thickness of about 0.01 to 0.02 inches and is provided with stiffening ribs 33.

The discharge device 29 is of generally T-shape including a cross member 35 of an insulator such as quartz to which the tube 27 is sealed, vacuum tight, by a graded seal 37 typically of KOVAR alloy. Graded seals are of constructions well known in the art and need not be further described. One example is element 17 of Fraser U.S. Pat. No. 2,682,009 issued Jun. 22, 1954. Electrodes 39 and 41 are sealed through the cross member 35. Electrode 39 is a shell enclosing electrode 41. Alternatively electrode 39 may be replaced by a conducting deposit on the inner wall of membrane 35. The latter electrode structure has the advantage that the dimensions of the member 35 may be small, enhancing sensitivity. The cross member is also provided with a tubular connection 43 which includes valve 45. Gas may be bled in and out of the discharge device 29 through the connection 43 and the valve 45. It is to be realized that the pressure in the device 29 increases as it is used because of the $H_2$ and $^3H_2$ (tritium molecule) which diffuses in and the $^3He$ which is generated. The quartz portion of the device 29 is completely enclosed by a lead shield 51 which prevents the penetration of gamma rays into the cross-member 35. Advantageously, the gas in the discharge device 29 is predominately argon (other gases may be used) at a pressure of about one-half atmosphere at the temperature of device 29. The pressure may be varied to improve gas multiplication of the charge. Cooling fins 52 are interposed between the jacket 25 and the shield 51. Depending on the demands of the facilities the discharge device 29 may take other forms than T-shape. Typically the cross member 35 may have a volume of about 100 $cm^3$.

The electrodes 39 and 41 are connected in circuit with a power supply 53 which may be a battery and a meter 55. Typically, the meter 55 is a vibrating-reed electrometer which can measure current as low as $10^{-15}$ amperes with reasonable accuracy. The meter 55 is shunted by a high resistance 57 of the order of $10^{11}$ ohms.

In the use of the apparatus shown in FIG. 1, the sodium flows continuously through the flow line 13, the heat exchanger 23, the module 21 and the jacket 25. The hydrogen and its isotopes diffuse into the tube 27 and the ionization produced by the radioactive emission of the tritium causes current to flow through the meter 55. When the magnitude of this current indicates excessive tritium the cold trapping (or slag trapping) is carried out to reduce the tritium in the sodium.

Figure 2:
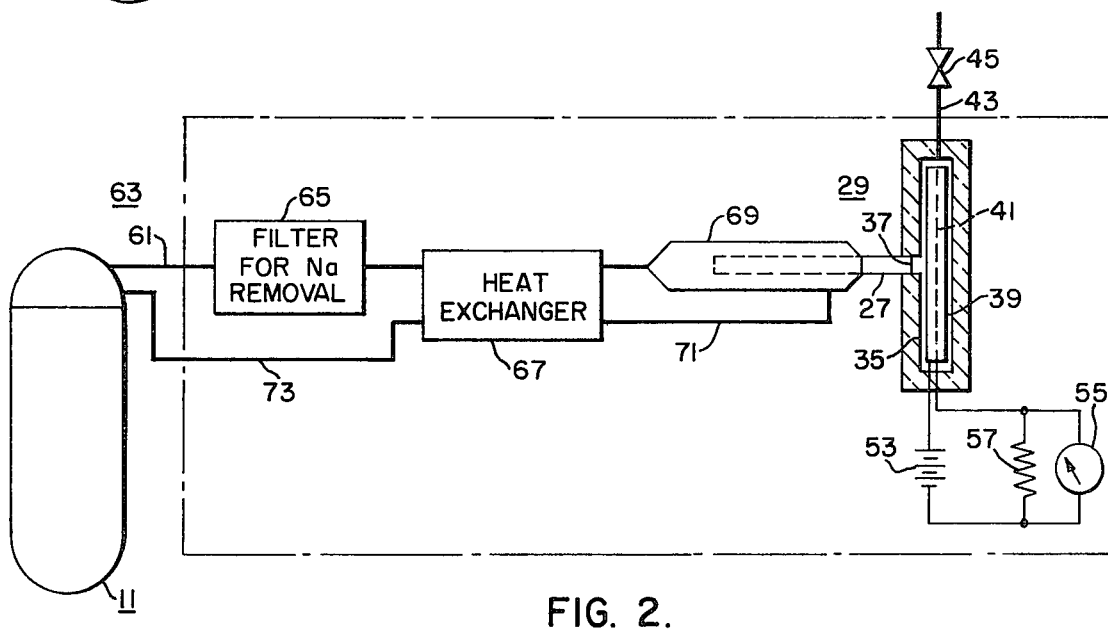
FIG. 2 is a diagrammatic view showing apparatus for monitoring the reactor-cover-gas for tritium.

In FIG. 2 the cover-gas, helium or argon, of the reactor vessel 11, or the gas coolant in a gas cooled breeder reactor is conducted through a branch 61 of flow line 63 through a filter 65 which removes sodium vapor from the gas. The gas is at a temperature of about 300° C. as it leaves the filter 65. The gas is passed through a heat exchanger 67 which raises its temperature to about 600° C. and then through a jacket 69 sealed to the tube 27 of the discharge device 29. The gas is returned to the vessel 11 through branch 71 of the flow line 63, heat exchanger 67, and branch 73. Hydrogen and its isotopes are diffused into tube 27 and the tritium produces ionization which is measured in meter 55.

While preferred practice of this invention has been disclosed herein, many modifications thereof are feasible. This invention is not to be restricted except insofar as is necessitated by the spirit of the prior art.

What is claimed is:

1. In a nuclear reactor including a reactor coolant, the method of monitoring the quantity of tritium in the coolant of said reactor comprising the steps of: flowing said reactor coolant into contact with a container which is permeable to hydrogen and its isotopes including tritium, diffusing said tritium into said container, ionizing a gas located within said container by said tritium diffused therein, generating a current within an electrical circuit by said ionized gas, said electrical circuit including a pair of electrodes located within said container, said electrodes having said ionized gas therebetween, a power supply, an electrical resistor and a current indicating meter, said power supply, said electrical resistor and said current indicating meter being connected to said electrical circuit external of said container, measuring the electrical current produced by said ionized gas, said current to being proportional to the amount of tritium within said reactor coolant, and deriving the quantity of tritium in said reactor coolant from said measurement.

2. The method of claim 1, including the step of heating said container and said reactor coolant to a temperature such that hydrogen and its isotopes within said reactor coolant will readily diffuse through a wall of said container.

3. The method of claim 2, wherein said container and said reactor coolant are heated to about 750° C. and said container includes a wall made of nickel having a thickness of about 0.01 inches.

4. The method of claim 1, including bypassing a portion of said reactor coolant from said reactor, flowing said portion of reactor coolant into contact with said container whereby hydrogen and its isotopes diffuse into said container, and returning said portion of reactor coolant to said reactor.

5. The method of claim 1, wherein the step of measuring the electrical current produced by said ionized gas is performed when hydrogen and its isotopes within said reactor coolant is in equilibrium with hydrogen and its isotopes within said container, said equilibrium being determinable when the current registered by said electrical meter is at a steady value.

6. The method of claim 1, wherein said reactor comprises a liquid metal cooled breeder nuclear reactor.

7. The method of claim 1, wherein said reactor comprises a gas cooled breeder nuclear reactor.

* * * * *